March 12, 1935.  C. T. NORTON  1,994,321
DIAL SYSTEM
Filed April 24, 1934

Inventor:
Charles T. Norton,
by Harry E. Dunham
His Attorney.

Patented Mar. 12, 1935

1,994,321

UNITED STATES PATENT OFFICE 1,994,321

DIAL SYSTEM

Charles T. Norton, Scotia, N. Y., assignor to General Electric Company, a corporation of New York Application April 24, 1934, Serial No. 722,215

6 Claims. (Cl. 116—124.2)

My invention relates to dial systems and while it is generally applicable I contemplate its use more particularly in connection with variable electrical devices such for example as the reactances of high frequency circuits.

In tuned circuits, such as those of an oscillator, one or more dials is generally provided in connection with the tuning element, which may be a condenser or inductance, by means of the calibration of which dial the frequency at which the circuit is tuned, may be indicated. In cases where such circuit elements are subject to temperature variations the different frequencies to which the circuit may be tuned may not always correspond respectively to fixed positions of the dial, due to the effect of temperature on the reactances of the circuit elements. Accordingly adjusting means must be provided to correct for such discrepancies in the reading of the dials as may be caused by such temperature variations.

My invention has for one of its objects to provide a novel and improved dial arrangement having means whereby the correction of the readings of a plurality of dials may be made with a minimum of trouble to the operator.

Figure 1:
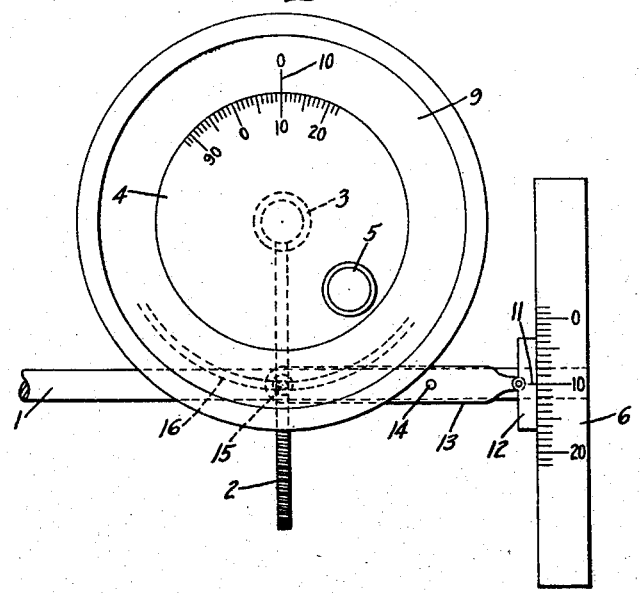
Figure 2:
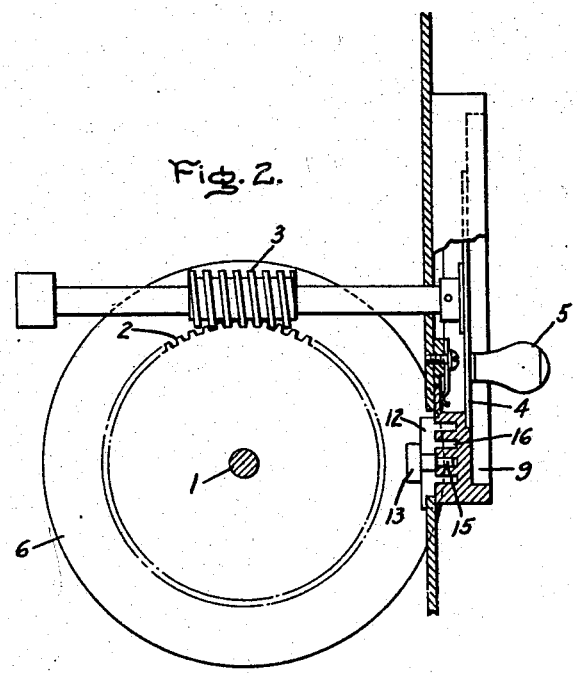

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawing in which Figs. 1 and 2 represent side views of my invention at right angles to each other, Fig. 2 being partly in section.

Referring to the drawing, I have indicated by the reference numeral 1 a shaft which may be the rotatable shaft of a variable circuit element, such as the condenser of the oscillatory circuit of an oscillator, for example. This shaft is operated by means of a worm gear 2 which is fixed thereon and which is driven by a worm wheel 3 to which is rigidly connected a rotatable dial 4. This dial is calibrated about its periphery and is provided with a handle 5 whereby it may be rotated to vary the constants of the circuit element connected to the shaft 1. A second dial 6 in the form of a drum is also rigidly attached to the shaft 1 and provided with a scale about a portion of its periphery.

The ratio of the worm 3 and worm gear 2 is, for example, 100:1 so that fifty revolutions of the dial 4 are necessary to rotate the shaft 1 through one-half of a revolution. Since the dial 6 is directly attached to the shaft 1 and is calibrated in fifty divisions extending over one-half of its periphery it will move the distance of a single division of its calibration in response to movement of the dial 4 throughout a complete revolution.

Thus to rotate the condenser throughout the complete range of its variation fifty rotations of the dial 4 are required, each rotation of which is indicated from the calibration of the scale 6 and each one hundredth of the rotation is indicated from the calibration of the dial 4. In this way the entire range of variation is divided into five thousand equal divisions each of which may be read directly from the scale, the thousands and hundreds digits being read from the dial 6 and the tens and units digits being read from the dial 4. Thus for example, with the dials shown in the position of Fig. 1, the reading is 1010.

Where the dials are used in connection with a tuning element of an oscillator, for example, a calibration curve may be provided indicating the frequency of the oscillator corresponding to each position of the dials as read from the calibrations thereof. It frequently happens, however, in the operation of such apparatus that external influences may affect the frequency of the oscillator so that when the dials are adjusted at a certain reading the frequency produced is not that shown by the calibration curve. In accordance with my invention means are provided whereby the zero position of the two dials may be adjusted to correct for such variation. These means comprise in the embodiment of the invention illustrated a third dial or index carrying member 9 which is mounted concentrically about the dial 4 as is clear from both of the figures of the drawing. This dial is arranged to rotate about the dial 4 and carries an index mark 10 corresponding to the zero position of the dial 4.

If we assume that the calibration curve indicates a frequency of, for example, 5000 kilocycles corresponding to a reading of the dials 1010 but upon setting the dials for that reading a different reading is obtained due, for example, to the temperature of the apparatus being different from that obtaining when the calibration curve was prepared, the operator will then adjust the dial 3 to such a position that the frequency of 5000 kilocycles is obtained. Let us suppose that the reading is now 1025. Index carrying member 9 is then moved to the position where the index mark corresponds to the reading 1010. Thus having corrected the zero position all other positions of the dial 4 will produce the frequency denoted by the chart.

It is necessary, however, that upon adjustment of the zero position of the dial 4 that the zero position of the dial 6 be likewise adjusted and by an amount proportionate to the adjustment of the zero position of the dial 4. For this purpose the index mark 11 denoting the zero position of the dial 6 is carried upon a member 12 pivotally secured to the right end of a lever 13 which is itself pivoted at the point 14. The left arm of this lever is provided with a pin 15 which is best shown in Fig. 2. This pin comprises a follower riding in a spiral groove 16 on the back of the index carrying member 9, as is best shown in Fig. 2, and as indicated by dotted line in Fig. 1. This spiral groove extends throughout the circumference of the dial member 9 and has such a pitch that the index mark carrying member 12 is moved vertically and relatively to the movement of the index mark 10 in the same ratio as exists in the relative movements of the dials 4 and 6. Thus if the index mark 10 be moved over fifteen divisions, the index mark 11 will be moved over fifteen hundredths of a division of the scale. In this way, irrespective of the temperature of the apparatus whenever the zero of the dial 4 is opposite the zero mark 10 the corresponding zero mark 11 will be exactly opposite one of the scale divisions of the dial 6 and both dials may be accurately read and checked with the calibration curve to obtain the desired frequency.

While I have shown a particular embodiment of my invention it will be understood that I do not wish to be limited thereto since different modifications may be made in the structure and form of my invention, and I therefore contemplate by the appended claims to cover all such modifications as fall within the true spirit and scope of my invention.

What I claim as new and desire to secure by Letters Patent of the United States, is:

1. In combination, a shaft, a plurality of dials, means mechanically connecting said dials to said shaft for movement therewith, the movement of one of said dials being greater than the movement of another of said dials, normally stationary reference indices cooperating respectively with said dials whereby the positions of said shaft may be determined by reading said dials with reference to said normally stationary reference indices, and means to move said normally stationary reference indices, the movement of one of said indices being greater than that of another of said indices and in a ratio thereto equal to the ratio of movements of said dials thereby to produce equal readings of said dials with reference to said normally stationary reference indices corresponding to different angular positions of said shaft.

2. In combination, a plurality of calibrated dials, normally stationary reference indices cooperating with said dials, means to move said dials in a multiple relation, and means to move said normally stationary reference indices over their respective dials in the same relation.

3. In combination, a shaft, a dial attached to said shaft for rotation therewith, a second dial geared to said shaft for rotation in a multiple relation to said first dial, movable indices cooperating respectively with said dials, and means mechanically connecting said indices to cause said indices to move in the same multiple relation as said dials.

4. In combination, a rotating dial, a circular rotating dial, a gear connection between said dials whereby one dial moves in a ratio with respect to the other determined by said gear connection, a rotatable index carrying member mounted concentrically with said circular rotating dial and cooperating therewith, a second index member cooperating with said first rotating dial and mounted for linear movement, and means to convert the rotary movement of said rotatable index member into linear movement of the other index member the movements of said index members being in a ratio equal to the ratio of said gear connection.

5. In combination, a pair of dials mounted at right angles to each other, means connecting said dials for relative movement in a digital relation, index members cooperating respectively with said dials, and means connecting said index members for movement in the same digital relation.

6. In combination, a pair of rotatable dials mounted at right angles to each other, means connecting said dials for rotary movement in a digital relation, a rotatable index member concentric with one of said dials and cooperating therewith, said index member carrying a spiral groove therein, a lever and follower connection with said spiral groove, and a second index carried by the lever of said lever and follower connection and cooperating with the other of said dials, said spiral and lever being proportioned to cause movement of said indices in digital relation.

CHARLES T. NORTON.